US011208565B2

(12) United States Patent
Ikeda et al.

(10) Patent No.: US 11,208,565 B2
(45) Date of Patent: Dec. 28, 2021

(54) WATER-SOLUBLE PAINT AND COATED CAN

(71) Applicants: TOYO INK SC HOLDINGS CO., LTD., Tokyo (JP); TOYOCHEM CO., LTD., Tokyo (JP)

(72) Inventors: Takayasu Ikeda, Tokyo (JP); Tetsuya Natsumoto, Tokyo (JP); Yuki Sato, Tokyo (JP)

(73) Assignees: TOYO INK SC HOLDINGS CO., LTD., Tokyo (JP); TOYOCHEM CO., LTD., Tokyo (JP)

( * ) Notice: Subject to any disclaimer, the term of this patent is extended or adjusted under 35 U.S.C. 154(b) by 514 days.

(21) Appl. No.: 15/903,036

(22) Filed: Feb. 23, 2018

(65) Prior Publication Data
US 2019/0153235 A1    May 23, 2019

(30) Foreign Application Priority Data

Nov. 22, 2017    (JP) .............................. JP2017-224929

(51) Int. Cl.
*C09D 5/02* (2006.01)
*B65D 1/16* (2006.01)
(Continued)

(52) U.S. Cl.
CPC ............. *C09D 5/022* (2013.01); *B65D 1/165* (2013.01); *C09D 133/08* (2013.01);
(Continued)

(58) Field of Classification Search
CPC ............. C09D 151/003; C09D 133/02; C09D 133/08; C09D 133/10; C09D 5/022;
(Continued)

(56) References Cited

U.S. PATENT DOCUMENTS

2006/0229415 A1* 10/2006 Boyer .................... C08J 3/03
  525/390
2014/0323641 A1* 10/2014 Lock ................... C09D 133/06
  524/517
(Continued)

FOREIGN PATENT DOCUMENTS

JP    2003253190    9/2003
JP    2015168759    9/2015
(Continued)

OTHER PUBLICATIONS

Machine translation of WO2015/015827A1 published Feb. 2015. (Year: 2015).*
"Office Action of Japan Counterpart Application", dated Mar. 23, 2021, with English translation thereof, pp. 1-7.
"Office Action of China Counterpart Application", dated Jun. 11, 2021, with English translation thereof, p. 1-p. 19.
(Continued)

Primary Examiner — Monique R Jackson
(74) Attorney, Agent, or Firm — JCIPRNET

(57) ABSTRACT

Processability of a paint film is improved and a water-soluble paint in which coloring during heating to a high temperature is minimized and which has excellent productivity and a coated can having a paint film of such a water-soluble paint are provided. A water-soluble paint including a polymer emulsion (C) and a phenolic resin (D) is provided; wherein the polymer emulsion (C) includes a shell part containing an acrylic polymer (A) having a carboxyl group and a core part containing an acrylic polymer (B) having an amide group, wherein the phenolic resin (D) includes a bifunctional phenolic resin (D2) based on a bifunctional phenol and a trifunctional phenolic resin (D3) based on a trifunctional phenol, and a mass ratio ((D2)/(D3)) between the bifunctional phenolic resin (D2) and the trifunctional phenolic resin (D3) is 95/5 to 40/60.

5 Claims, 2 Drawing Sheets

(51) Int. Cl.
  *C09D 133/08* (2006.01)
  *C09D 151/00* (2006.01)
  *C09D 161/06* (2006.01)
  *C09D 133/10* (2006.01)
  *B65D 23/02* (2006.01)

(52) U.S. Cl.
  CPC ....... *C09D 133/10* (2013.01); *C09D 151/003* (2013.01); *C09D 161/06* (2013.01); *B65D 23/02* (2013.01)

(58) Field of Classification Search
  CPC .... C08L 161/06; C08L 220/18; C08L 220/54; C08L 220/56; C08L 220/58; C08L 51/003; C08L 33/02; C08L 33/08; C08L 33/10; C08L 61/06; C08F 265/06; C08F 220/58; C08F 220/18; C08F 220/54; C08F 220/56; B65D 1/165; B65D 23/02
  See application file for complete search history.

(56) References Cited

U.S. PATENT DOCUMENTS

2015/0376435 A1\* 12/2015 Youlton ............... C09D 133/00
  206/524.3
2019/0002724 A1\* 1/2019 DeSousa ................ B65D 1/165

FOREIGN PATENT DOCUMENTS

JP 2015-193834 11/2015
JP 2015193834 11/2015
WO WO-2015015827 A1 \* 2/2015 ............. B65D 25/14

OTHER PUBLICATIONS

"Office Action of China Counterpart Application", dated Mar. 17, 2021, with English translation thereof, p. 1-p. 12.
"Office Action of Japan Counterpart Application", dated Sep. 7, 2021, with English translation thereof, p. 1-p. 4.
"Decision of Rejection of China Counterpart Application", issued on Aug. 24, 2021, with English translation thereof, p. 1-p. 14.

\* cited by examiner

WATER-SOLUBLE PAINT AND COATED CAN

CROSS-REFERENCE TO RELATED APPLICATIONS

This application claims the priority benefit of Japanese Patent Application No. 2017-224929, filed on Nov. 22, 2017. The entirety of the above-mentioned patent application is hereby incorporated by reference herein and made a part of this specification.

BACKGROUND

Technical Field

The disclosure relates to a water-soluble paint and a coated can.

Related Art

As a paint for a can, a water-soluble paint which does not contain a bisphenol A (BPA) type epoxy resin is being studied. An emulsion type acrylic resin is being studied as one of resins for replacing a BPA type epoxy resin.

The inventors of the disclosure describe a specific water-soluble paint such as a specific water-soluble paint having a carboxyl group, a polymer emulsion obtained by polymerizing specific monomers, and a phenolic resin as a water-soluble paint which has good retort resistance, in which whitening or blistering of a paint film is minimized, and which has good sanitary properties in Japanese Laid-open No. 2015-193834.

SUMMARY

An embodiment of a water-soluble paint related to the specification includes: a polymer emulsion (C) including a shell part containing an acrylic polymer (A) having a carboxyl group and a core part containing an acrylic polymer (B) having an amide group; and a phenolic resin (D), wherein the phenolic resin (D) includes a bifunctional phenolic resin (D2) based on a bifunctional phenol and a trifunctional phenolic resin (D3) based on a trifunctional phenol, and a mass ratio ((D2)/(D3)) between the bifunctional phenolic resin (D2) and the trifunctional phenolic resin (D3) is 95/5 to 40/60.

In an embodiment of a coated can related to the specification, a paint film of a water-soluble paint according to the embodiment is provided on at least a part of a can member surface.

BRIEF DESCRIPTION OF THE DRAWINGS

FIG. 3(a) is a schematic diagram before a test panel is folded, FIG. 3(b) is a schematic diagram for describing preparation of a test piece by bending the test panel, and FIG. 3(c) is a schematic diagram for describing a method for dropping a weight onto the test piece.

DESCRIPTION OF THE EMBODIMENTS

A water-soluble paint and a coated can of the present specification will be described below.

Note that, in an embodiment, monomers are ethylenically unsaturated monomers. Furthermore, (meth)acrylic acid includes acrylic acid and methacrylic acid and (meth)acrylate includes acrylates and methacrylates.

In the embodiment, "polymers" are assumed to include "copolymers."

In the embodiment, the expression "water-soluble" means that a solubility in water is 1.0 part by mass or more under conditions at 20° C. Furthermore, the expression "nonionic" refers to a property in which cationic moieties and anionic moieties cannot be generated in a molecular structure in water and the expression "ionic" expressed as an antonym of the expression "nonionic" refers to a property in which at least one of a cationic moiety and an anionic moiety can be present in a molecular structure in water.

Also, in the embodiment, a paint film refers to a painted film after a substrate such as a metal plate is painted with a water-soluble paint and crosslinking has been completed.

Figure 1:
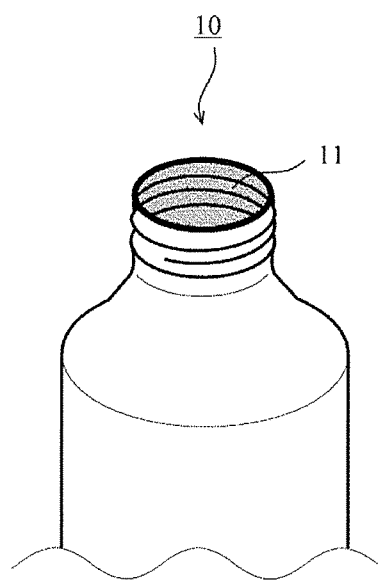
FIG. 1 is a schematic perspective view for describing an embodiment of a coated can.

A good paint film can be obtained from an acrylic resin water-soluble paint by heating it to about 200° C. On the other hand, the inventors of the disclosure found that a paint film of a water-soluble paint became colored in some cases when a heating temperature was increased to improve a line speed in view of improving productivity. When attempting to ameliorate the coloring, for example, processability may deteriorate and cracks may occur in a paint film during bending in some cases. Particularly, in recent years, for example, as shown in FIG. 1, a machining shape such as provision of a cap thread or the like in an opening 11 of a coated can 10 has become more sophisticated, and improvement of processability is required.

[Water-Soluble paint]

A water-soluble paint according to an embodiment includes: a polymer emulsion (C) including a shell part containing an acrylic polymer (A) having a carboxyl group (hereinafter simply referred to as an "acrylic polymer (A)" in some cases) and a core part containing an acrylic polymer (B) having an amide group (hereinafter simply referred to as an "acrylic polymer (B)" in some cases); and a phenolic resin (D), wherein the phenolic resin (D) includes a bifunctional phenolic resin (D2) based on a bifunctional phenol and a trifunctional phenolic resin (D3) based on a trifunctional phenol, and a mass ratio ((D2)/(D3)) between the bifunctional phenolic resin (D2) and the trifunctional phenolic resin (D3) is 95/5 to 40/60.

In the embodiment of the coated can related to the specification, the paint film of the water-soluble paint in the embodiment is provided on at least a part of a can member surface.

The water-soluble paint according to the embodiment uses a combination the bifunctional phenolic resin (D2) and the trifunctional phenolic resin (D3) at a specific ratio so that processability of the paint film is improved and coloring of the paint film during heating to a high temperature is minimized. Thus, a paint film having excellent productivity can be obtained. Components of such a water-soluble paint will be sequentially described in detail below. Note that the water-soluble paint in the embodiment does not contain raw materials derived from bisphenol A.

<Polymer Emulsion (C)>

The polymer emulsion (C) in the embodiment includes a shell part containing the acrylic polymer (A) having a carboxyl group and a core part containing the acrylic polymer (B) having an amide group. Usually, the polymer emulsion (C) contains a solvent such as water and may further include other components as necessary. Hereinafter, components constituting the polymer emulsion (C) will be described and then a production method thereof will be described.

(Acrylic Polymer (A))

The acrylic polymer (A) is a polymer having a carboxyl group and is preferably a polymer obtained by (co)polymerizing a monomer having a carboxyl group and other monomers as necessary.

The acrylic polymer (A) has a carboxyl group in order that it can be dissolved or dispersed in water and facilitates emulsion polymerization of a monomer (B1) serving as a precursor of the acrylic polymer (B) which will be described below.

Examples of a monomer having a carboxyl group include (meth)acrylic acid, itaconic acid, maleic acid, and the like and a divalent acid may be an anhydride.

A single kind or a combination of two or more kinds of monomer having a carboxyl group can be used.

Examples of the acrylic polymer (A) include other monomers in view of achieving both processability and corrosion resistance. Examples of other monomers include alkyl (meth)acrylate-based monomers such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate;

aromatic-based monomers such as styrene and α-methylstyrene;

amide-based monomers such as N-alkoxyalkyl (meth)acrylamide, N-hydroxyalkyl (meth)acrylamide, and (meth)crylamide, and the like. More specific examples of amide-based monomers include amide-based monomers which are the same as the amide-based monomers exemplified for the acrylic polymer (B) which will be described below.

Other monomers can be used as a single kind or a combination of two or more kinds.

A proportion of a monomer having a carboxyl group with respect to monomers constituting the acrylic polymer (A) is preferably 10 mass % or more, more preferably 15 mass % or more and 90 mass % or less, and further more preferably 20 mass % or more and 80 mass % or less with respect to 100 mass % of a total amount of monomers constituting the acrylic polymer (A).

When monomers constituting the acrylic polymer (A) include alkyl (meth)acrylate-based monomers, the proportion of alkyl (meth)acrylate-based monomers included is preferably 5 mass % or more and 90 mass % or less, more preferably 6 mass % or more and 85 mass % or less, and further more preferably 10 mass % or more and 80 mass % or less with respect to 100 mass % of a total amount of monomers constituting the acrylic polymer (A). Processability is improved by blending in 5 mass % or more of these monomers and corrosion resistance is improved with 90 mass % or less of these monomers.

When monomers constituting the acrylic polymer (A) include aromatic-based monomers, the proportion of aromatic-based monomers included is preferably 1 mass % or more and 80 mass % or less, more preferably 5 mass % or more and 75 mass % or less, and still more preferably 10 mass % or more and 70 mass % or less with respect to the total amount of monomers constituting the acrylic polymer (A) of 100 mass %. Corrosion resistance is improved by blending the monomer of 1 mass % or more and processability is improved by setting the monomer to 80 mass % or less.

When a monomer constituting the acrylic polymer (A) is an amide-based monomer, the amide-based monomer-containing proportion is preferably 0.1 mass % or more and 10 mass % or less, more preferably 0.5 mass % or more and 8 mass % or less, and further more preferably 1 mass % or more and 5 mass % or less with respect to 100 mass % of a total amount of monomers constituting the acrylic polymer (A). When the lower limit value or more of amide-based monomers are included, improvement in dispersion stability and improvement in crosslinking density due to crosslinking with amide-based monomers in the core part which will be described below, and improvement in crosslinking density due to a crosslinking reaction with the phenolic resin which will be described below, and the like, can be obtained. On the other hand, a water-soluble paint having excellent paint film processability and excellent productivity can be obtained even when the acrylic polymer (A) does not include amide-based monomers in the embodiment.

Synthesis of the acrylic polymer (A) can be appropriately selected from known polymerization methods such as emulsion polymerization, suspension polymerization, solution polymerization, and bulk polymerization. Among these, solution polymerization in which control of a molecular weight and reaction are facilitated is desirable.

A known method may be appropriately selected as a solution polymerization method. Examples of such a solution polymerization method include a method of polymerizing adjusted proportions of the above-described monomers by adding the monomers and an initiator dropwise to a heated solvent and then heating the mixture as necessary. In such solution polymerization, a known solvent used for solution polymerization application can be used as a solvent and a solvent containing water may be adopted as the solvent. Furthermore, an initiator used for solution polymerization is not particularly limited, and for example, any of peroxides including organic peroxides, azo compounds, and the like can suitably be used.

Examples of such peroxides include dibutyl peroxide, benzoyl peroxide (benzoyl peroxide), acetyl peroxide, methyl ethyl ketone peroxide, lauroyl peroxide, and the like.

Also, examples of such azo compounds include azobisisobutyronitrile, azobisisovaleronitrile, and the like.

In the embodiment, it is desirable to use peroxides as an initiator. In addition, among these, it is more desirable to use benzoyl peroxide (benzoyl peroxide).

The acrylic polymer (A) obtained by solution polymerization may be subjected to solvent removal as necessary and may be used as an aqueous solution obtained by adding a basic compound and water to the acrylic polymer (A) without removing a solvent.

A number average molecular weight of the acrylic polymer (A) is preferably 5,000 to 100,000, more preferably 7,000 to 90,000, and further more preferably 10,000 to 70,000. If a number average molecular weight is 5,000 or more, solution stability of the obtained polymer emulsion (C) can be further improved and formation of aggregates can be further reduced. Furthermore, if a number average molecular weight is 100,000 or less, the viscosity of a paint is more easily able to be adjusted to a viscosity at which painting is facilitated and the amount of aggregates can also be further reduced.

A glass transition temperature (Tg) of the acrylic polymer (A) is preferably −15° C. or more and more preferably 5° C. or more. An upper limit of Tg described above is not particularly limited because the acrylic polymer (A) can be adopted as long as the acrylic polymer (A) functions as a polymer emulsifier, but is preferably about 130° C. or less and more preferably 100° C. or less.

(Acrylic Polymer (B))

The acrylic polymer (B) is a polymer having an amide group and is preferably a polymer obtained by (co)polymerizing an amide-based monomer and other monomers as necessary.

Such an amide-based monomer is preferably an N-alkoxyalkyl (meth)acrylamide, an N-hydroxyalkyl (meth)acrylamide, or a (meth)acrylamide. To be specific, examples of such an amide-based monomer include N-hydroxyalkyl (meth)acrylamides such as N-hydroxymethyl (meth)acrylamide, N-hydroxyethyl (meth)acrylamide, and N-hydroxybutyl (meth)acrylamide;

N-alkoxyalkyl (meth)acrylamides such as N-methoxymethyl (meth)acrylamide, N-ethoxyethyl (meth)acrylamide, N-(n-,iso) butoxymethyl (meth)crylamide, N-methoxyethyl (meth)acrylamide, N-ethoxyethyl (meth)acrylamide, and N-(n-,iso) butoxyethyl (meth)acrylamide; and (meth)acrylamides.

Amide-based monomers can be used as a single kind or a combination of two or more kinds.

Also, examples of other monomers preferably used for the acrylic polymer (B) include alkyl (meth)acrylate-based monomers such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate;

monomers having a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate;

aromatic-based monomers such as styrene and α-methylstyrene, and the like.

Other monomers can be used as a single kind or a combination of two or more kinds.

A proportion of an amide-based monomer with respect to monomers constituting the acrylic polymer (B) (hereinafter referred to as a monomer (B1) in some cases) is preferably 0.1 mass % or more, more preferably 0.5 mass % or more and 20 mass % or less, and further more preferably 1 mass % or more and 15 mass % or less with respect to 100 mass % of a total amount of monomers constituting the acrylic polymer (B). The acrylic polymer (B) includes an amide-based monomer at 0.1 mass % or more so that effects such as dispersion stability improvement due to a crosslink with the shell part or crosslink density improvement can be obtained. On the other hand, in the acrylic polymer (B), the above-described effects are fully exhibited when there is 20 mass % or less of amide-based monomers.

(Nonionic Water-Soluble Radical Initiator)

In synthesis of the acrylic polymer (B) which will be described below, in order to polymerize the amide-based monomer and other monomers to be used as necessary, it is desirable to use a nonionic water-soluble radical initiator. It is possible to suppress an increase in hydrophilicity of a polymer emulsion and to minimize water resistance, retort resistance, and peeling of the paint film using the nonionic water-soluble radical initiator.

For this, the nonionic water-soluble radical initiator is preferably a peroxide or an azo initiator.

Examples of such peroxides include hydrogen peroxide, tert-butyl hydroperoxide, cumene hydroperoxide, diisopropylbenzene hydroperoxide, p-menthane hydroperoxide, and the like.

Examples of such an azo initiator include 2,2'-azobis[2-(2-imidazolin-2-yl)propane], 2,2'-azobis {2-methyl-N-[1,1-bis(hydroxymethyl)-2-hydroxyethyl]propionamide}, 2,2'-azobis[2-methyl-N-(2-hydroxyethyl)propionamide], and the like.

Among these, peroxides are desirable, and hydrogen peroxide and tert-butyl hydroperoxide are more desirable.

Such nonionic water-soluble radical initiators can be used as a single kind or a combination of two or more kinds.

Also, in polymerization of the monomer (B1) in synthesis of the acrylic polymer (B), redox type polymerization through a combination of the nonionic water-soluble radical initiator and a reducing agent is desirable. In this case, the nonionic water-soluble radical initiator acts as an oxidant. It is possible to increase a polymerization rate and perform a polymerization reaction at a low temperature by performing a polymerization reaction using redox type polymerization.

Any of reducing organic compounds and reducing inorganic compounds can suitably be used as the reducing agent. Examples of such a reducing organic compound include metal salts (sodium salts, potassium salts, calcium salts, etc.) of for example ascorbic acid, erythorbic acid, tartaric acid, and citric acid, glucose, and formaldehyde sulfoxylate.

Examples of such reducing inorganic compounds include sodium thiosulfate, sodium sulfite, sodium bisulfite, sodium metabisulfite, and the like.

Among these, such a reducing agent is preferably a reducing organic compound, more preferably a metal salt of ascorbic acid or erythorbic acid, and further more preferably sodium ascorbate or sodium erythorbate.

There is preferably 0.01 to 1 parts by mass of such a nonionic water-soluble radical initiator with respect to 100 parts by mass of the monomer (B1).

Also, such a reducing agent is preferably 0.01 to 2 parts by mass with respect to 100 parts by mass of the monomer (B1).

The acrylic polymer (B) is synthesized by performing emulsion polymerization on the amide-based monomer and other monomers as necessary using the above-described acrylic polymer (A) having the carboxyl group as a polymer emulsifier in the presence of water. Note that, in the embodiment, the polymer emulsion (C) is formed by synthesizing the acrylic polymer (B).

Emulsion polymerization of the acrylic polymer (B) can be performed using an appropriately selected known polymerization method.

Examples of such emulsion polymerization of the acrylic polymer (B) include a method for synthesizing the acrylic polymer (B) by performing emulsification (referred to as "pre-emulsification") on a monomer using the acrylic polymer (A) and a basic compound, supplying the monomer into a reaction tank, and then performing emulsion polymerization on the monomer.

A method for using the nonionic water-soluble radical polymerization initiator is preferably a method in which the nonionic water-soluble radical polymerization initiator is mixed with the acrylic polymer (A) and used during an emulsion polymerization reaction or a method in which the nonionic water-soluble radical polymerization initiator is added into a reaction tank and used when the monomer (B1) for the acrylic polymer (B) is added or after the monomer (B1) has been added. A method for adding a nonionic water-soluble radical polymerization initiator may be any of intermittent, continuous, batch addition, and the like.

A water-soluble or water-dispersible resin may be used with the acrylic polymer (A) when the pre-emulsification is performed. A polyester resin containing a carboxyl group, an acrylic-modified polyester resin, a cellulose resin, and polyvinyl alcohol, derivatives thereof, or the like can be appropriately used as the water-soluble or water-dispersible resin.

Also, both a water-soluble organic solvent and water may be used as a solvent when emulsion polymerization is performed. Pre-emulsification of monomers is facilitated using a water-soluble organic solvent in some cases.

Other examples of emulsion polymerization of the acrylic polymer (B) include a method for synthesizing the acrylic polymer (B) by feeding water and the acrylic copolymer (A) into a reaction tank and then performing emulsion polymerization on the mixture while adding the monomer (B1).

This method is particularly advantageous when the viscosity of an aqueous solution increases when pre-emulsification is performed and it is difficult to stably drop an aqueous solution which has been subjected to pre-emulsification from a dropping tank of a reaction device.

When emulsion polymerization is performed, the acrylic polymer (A) is preferably 10 to 200 parts by mass, more preferably 15 to 150 parts by mass, and further more preferably 20 to 100 parts by mass with respect to 100 parts by mass of the monomer (B1). Emulsification of the monomer (B1) is facilitated by setting the acrylic polymer (A) to 10 parts by mass or more. Furthermore, processability of the paint film is improved by setting the acrylic polymer (A) to 200 parts by mass or less.

In this way, the polymer emulsion (C) is obtained by synthesizing the acrylic polymer (B) through emulsion polymerization. A glass transition temperature (Tg) of a polymer during the polymer emulsion (C) is preferably 0° C. to 100° C. and more preferably 0° C. to 70° C. If Tg is 0° C. or more, the paint film has excellent scratch resistance. Furthermore, if Tg is 100° C. or less, the paint film has excellent processability.

Note that Tg of a polymer is a calculation value calculated from homo Tg and a blending ratio of monomers constituting the acrylic polymer (A) and the acrylic polymer (B). In the embodiment, a value obtained by using a FOX expression is assumed to be used. Note that a value described in the Polymer Handbook (published in 1975, second edition) is used as the homo Tg of monomers.

<Phenolic Resin (D)>

In the embodiment, the water-soluble paint contains the phenolic resin (D) which is a reaction product of phenols and aldehydes. In the embodiment, the phenolic resin (D) includes at least the bifunctional phenolic resin (D2) based on a bifunctional phenol and the trifunctional phenolic resin (D3) based on a trifunctional phenol.

Examples of such a phenolic resin (D) include a resol type phenolic resin and a novolak type phenolic resin.

Examples of such a resol type phenolic resin include an alkaline resol type phenolic resin using an alkali metal hydroxide or an alkaline earth metal hydroxide as a catalyst and an ammonia resol type phenolic resin using ammonia or amines as a catalyst.

Examples of such a novolak type phenolic resin include a novolak type phenolic resin using an acidic catalyst and an alkaline resol novolak type phenolic resin obtained by reacting a novolak type phenolic resin with an alkali metal hydroxide or an alkali metal hydroxide.

Among these, the phenolic resin (D) is more preferably an alkaline resol type phenolic resin and an alkaline resol novolak type phenolic resin in view of self-crosslinking, or a curing agent reacting with a reactive functional group such as the carboxyl group or the amide group of the acrylic copolymer (A) and the amide group of the acrylic copolymer (B) and in view of coloring suppression during heating to a high temperature.

In the embodiment, the phenolic resin (D) includes the bifunctional phenolic resin (D2) and the trifunctional phenolic resin (D3) and the mass ratio ((D2)/(D3)) between the bifunctional phenolic resin (D2) and the trifunctional phenolic resin (D3) is 95/5 to 40/60 and preferably 95/5 to 50/50.

When the paint film contains the bifunctional phenolic resin (D2) and the trifunctional phenolic resin (D3) at the above ratio, processability of the paint film is improved and coloring (yellowing) during heating to a high temperature is minimized and thus a paint film having excellent retort resistance, corrosion resistance, and sanitary can be obtained. Excellent processability can be obtained by providing the bifunctional phenolic resin (D2) and hardness can be improved by providing the trifunctional phenolic resin (D3).

In phenols, ortho positions and para positions are reactive sites with respect to a phenolic hydroxyl group. Therefore, in the embodiment, the bifunctional phenol refers to phenols which have a substituent having no crosslinking properties such as those having an alkyl group or a phenyl group at any one of the ortho positions or para positions. Such a bifunctional phenol has two reactive sites in one molecule.

Also, the trifunctional phenol refers to phenols which have no substituents having crosslinking properties at the ortho positions or para positions. Such a trifunctional phenol has three reactive sites in one molecule.

Specific examples of such a bifunctional phenol include o-cresol, p-cresol, p-phenylphenol, p-nonylphenol, 2,3-xylenol, 2,5-xylenol, and the like.

Also, specific examples of such a trifunctional phenol include phenol (carbolic acid), m-cresol, 3,5-xylenol, resorcinol, and the like.

Examples of such an alkaline resol type phenolic resin include phenolic resins which can be obtained by reacting the above-described phenols and aldehydes in the presence of an alkaline catalyst. The alkaline resol type phenolic resin obtained through such a method has an alkylol group on at least some of the ortho positions and para positions and has a structure in which a part of a phenol aromatic ring is subjected to crosslinking via an alkylene group and an alkyl ether group.

Examples of such an alkylol group constituting the alkaline resol type phenolic resin include an alkylol group having 1 to 5 carbon atoms. Among these, a methylol group, an ethylol group, and a propylol group are desirable and a methylol group is more desirable. Furthermore, examples of such an alkylene group for crosslinking of phenol include an alkylene group having 1 to 5 carbon atoms. A methylene group, an ethylene group, and a propylene group are desirable and a methylene group is more desirable. The number of carbon atoms of an alkylol group and an alkylene group are the same as the number of carbon atoms of an aldehyde used as a raw material. In the embodiment, it is desirable to use formal aldehyde as an aldehyde.

Examples of such a method for synthesizing the alkaline resol novolak type phenolic resin include performing synthesis by reacting the novolak type phenolic resin obtained by reacting the above-described phenols and aldehydes in the presence of the acidic catalyst with the alkaline catalyst. The alkaline resol novolak type phenolic resin obtained through such a synthesis method has a structure in which an aromatic ring is bonded to an aromatic ring via an alkylene group and an alkylol group is provided on at least a part of ortho positions and para positions.

Examples of such an alkaline catalyst include an alkali metal hydroxide such as sodium hydroxide, lithium hydroxide, and potassium hydroxide, an alkaline earth metal hydroxide such as magnesium hydroxide and calcium hydroxide, amines such as triethylamine, trimethylamine, and ethanolamine, and the like.

Examples of such an acidic catalyst include inorganic acids such as hydrochloric acid, sulfuric acid, and phosphoric acid, and organic acids such as formic acid, acetic acid, oxalic acid, succinic acid, maleic acid, fumaric acid, and p-toluenesulfonic acid, and the like.

In addition, at least some of the alkylol groups contained in the phenolic resin (D) may be etherified using an alcohol having 1 to 12 carbon atoms. Compatibility with the polymer emulsion (C) can be improved and a crosslinking reaction can be prompted through etherification.

A number average molecular weight of the phenolic resin (D) is not particularly limited, but is preferably 300 to 4,000, more preferably 400 to 3,000, and further more preferably 500 to 2,500 in view of curability.

The phenolic resin (D) preferably contains 0.1 parts by mass or more and 25 parts by mass or less, more preferably contains 0.3 parts by mass or more and 20 parts by mass or less, and further more preferably contains 0.5 parts by mass or more and 15 parts by mass or less with respect to 100 parts by mass of a solid content of the polymer emulsion (C). Note that, in the embodiment, a solid content refers to a sum of all components except for a solvent.

<Other Components>

The water-soluble paint according to the embodiment may contain other components as necessary within a range in which effects are not impaired. Components which can be suitably included will be described below.

(Acidic Catalyst)

The water-soluble paint according to the embodiment may further contain an acidic catalyst. A curing rate of the paint film can be arbitrarily adjusted due to the acidic catalyst being contained. It is assumed that this is because of formation of self-crosslinking of the amide groups of the acrylic polymer (B) having the amide group, crosslinking between the amide group and the phenolic resin (D), and self-crosslinking of the phenolic resins (D). Examples of such an acidic catalyst include dodecylbenzenesulfonic acid, methanesulfonic acid, p-toluenesulfonic acid, dinonylnaphthalenedisulfonic acid, trifluoromethanesulfonic acid, and sulfuric acid, neutralized products thereof, and the like.

Such an acidic catalyst is preferably 0.005 to 5 parts by mass and more preferably 0.01 to 5 parts by mass with respect to 100 parts by mass which is a sum of a solid content of the polymer emulsion (C) and the phenolic resin (D). A curing rate can be improved without degrading paint film physical properties by containing 5 parts by mass or less of an acidic catalyst.

(Basic Compound)

The water-soluble paint according to the embodiment may contain a basic compound.

At least some of the carboxyl groups in the acrylic polymer (A) can be neutralized due to the basic compound being contained. Furthermore, the basic compound can be used at the time of pre-emulsification of the acrylic polymer (B).

Preferable examples of the basic compound include an organic amine compound, ammonia, an alkali metal hydroxide, and the like.

Examples of such an organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, triisopropanolamine, and the like.

Examples of such an alkali metal hydroxide include lithium hydroxide, sodium hydroxide, potassium hydroxide, and the like. The basic compound can be used as a single kind or a combination of two or more kinds.

The content of the basic compound is preferably adjusted so that the pH of the water-soluble paint is about 5 to 9.

(Amino Resin)

The water-soluble paint according to the embodiment may further include an amino resin. The amino resin serves as a curing agent reacting with a reactive functional group such as the carboxyl group or the amide group of the acrylic copolymer (A), or the amide group of the acrylic copolymer (B) without self-crosslinking like in the above-described phenolic resin (D).

Examples of such an amino resin include a compound and the like obtained through addition reaction of urea, melamine or benzoguanamine with fonnalaldehyde. Furthermore, in addition to an amino resin, polyvinyl alcohol, derivatives thereof, and the like can also be used as a curing agent.

(Lubricant)

The water-soluble paint according to the embodiment may contain a lubricant as necessary. If a lubricant is blended in the water-soluble paint, for example, it becomes easy to prevent scratching of the paint film in a process of producing a can.

Examples of such a lubricant include waxes and the like. In addition, specific examples of such waxes include plant and animal waxes such as beeswax, lanolin wax, spermaceti, candelilla wax, carnauba wax, rice wax, vegetable wax, jojoba oil, and palm oil;

mineral-based and petroleum-based waxes such as montan wax, ozogenite, ceresin, paraffin wax, microcrystalline wax, and petrolatim; and synthetic waxes such as Fischer-Tropsch wax, polyethylene wax, oxidized polyethylene wax, oxidized polypropylene wax, polypropylene wax, montan wax, derivatives thereof, paraffin wax, derivatives thereof, microcrystalline wax, derivatives thereof, and Teflon (registered trademark) wax.

(Hydrophilic Organic Solvent)

Also, the water-soluble paint according to the embodiment usually contains water and may contain a hydrophilic organic solvent as necessary. For example, paintability or the like can be improved due to the hydrophilic organic solvent being contained.

Examples of such a hydrophilic organic solvent include various ester alcohols or esters such as ethylene glycol monomethyl ester, ethylene glycol dimethyl ester, ethylene glycol monoethyl ester, ethylene glycol diethyl ester, ethylene glycol mono(iso)propyl ester, ethylene glycol di(iso) propyl ester, ethylene glycol mono(iso)butyl ester, ethylene glycol di(iso)butyl ester, ethylene glycol mono-tert-butyl ester, ethylene glycol monohexyl ester, 1,3-butylene glycol-3-monomethyl ester, 3-methoxybutanol, 3-methyl-3-methoxybutanol, diethylene glycol monomethyl ester, diethylene glycol dimethyl ester, diethylene glycol monoethyl ester, diethylene glycol diethyl ester, diethylene glycol mono(iso)propyl ester, diethylene glycol di(iso)propyl ester, diethylene glycol mono(iso)butyl ester, diethylene glycol di(iso)butyl ester, diethylene glycol monohexyl ester, diethylene glycol dihexyl ester, triethylene glycol dimethyl ester, propylene glycol monomethyl ester, propylene glycol monoethyl ester, propylene glycol mono(iso)propyl ester, propylene glycol mono(iso)butyl ester, propylene glycol dimethyl ester, propylene glycol diethyl ester, propylene glycol di(iso) propyl ester, propylene glycol di(iso)butyl ester, dipropylene glycol monomethyl ester, dipropylene glycol monoethyl ester, dipropylene glycol mono(iso)propyl ester, dipropylene glycol mono(iso)butyl ester, dipropylene glycol dimethyl ester, dipropylene glycol diethyl ester, diethylene glycol di(iso)propyl ester, and dipropylene glycol di(iso)butyl ester;

alcohols such as methyl alcohol, ethyl alcohol, propyl alcohol, isopropyl alcohol, butyl alcohol, isobutyl alcohol, sec-butyl alcohol, tert-butyl alcohol, 2-ethylhexanol, and furfuryl alcohol;

ketones such as methyl ethyl ketone, dimethyl ketone, and diacetone alcohol;

glycols such as ethylene glycol, diethylene glycol, propylene glycol, and dipropylene glycol; and alkoxy esters such as ethylene glycol monomethyl ester acetate, ethylene glycol monoethyl ester acetate, 1-methoxy-2-propyl acetate, and propylene glycol monomethyl ester acetate, and the like.

The hydrophilic organic solvent can be used as a single kind or a combination of two or more kinds.

Also, the water-soluble paint according to the embodiment may further contain various components such as a hydrophobic organic solvent, a surfactant, and an antifoaming agent.

<Usage of Water-Soluble Paint>

The water-soluble paint according to the embodiments can be suitably used for the purpose of forming a paint film for coating, for example, metal and plastic members. Particularly, application of the water-soluble paint to coating cans for storing beverages, foods, or the like is desirable and applications thereof in which inner surfaces of cans are coated is more desirable. Furthermore, the water-soluble paint can also be suitably used for members for storing products other than foods such as engine oil.

Preferable examples of such metals include aluminum, a tin-plated steel plate, a chromium-treated steel plate, a nickel-treated steel plate, and the like and these can further be subjected to a surface treatment such as a zirconium treatment or a phosphoric acid treatment. Furthermore, preferable examples of such plastics include polyolefins such as polyethylene and polypropylene, polyesters such as polyethylene terephthalate, and the like.

Thicknesses of such metals are usually 0.1 to 1 mm.

[Coated Can]

In the coated can according to the embodiment, at least a part of the can member surface has the paint film of the water-soluble paint according to the embodiment.

When such a coated can has the paint film of the water-soluble paint according to the embodiment, coloring can be suppressed and excellent retort resistance, corrosion resistance, and sanitary properties can be provided.

In the coated can according to the embodiment, the paint film may be provided on any of an inner surface and an outer surface of a can, but is preferably provided on an inner surface of a can in contact with beverages or foods in view of excellent retort resistance, corrosion resistance, and sanitary.

Examples of a shape of the coated can according to the embodiment include an aspect in which a can lid and a can shell member are provided, that is, a so-called bottle can including a can lid and a can shell member. Regarding a coated can, a two-piece can constituted of one lid member and one can shell member and a three-piece can constituted of two members, that is, upper and lower lid members and one can shell member are desirable. It is desirable that a bottle part have a drinking mouth having a screw used when the lid opens or closes the drinking mouth. Note that a shape of a coated can is not limited to the above-described shapes.

A method for producing the coated can is not particularly limited, and for example, a metal plate before molding may be painted with the water-soluble paint, a metal member after a can has been shaped may be painted with the water-soluble paint, and a can which will be described below may be painted with the water-soluble paint, for example, after trimming in a process of molding the can. Since the water-soluble paint according to the embodiment has excellent processability, even in a method for painting a metal plate before molding with the water-soluble paint, problems such as cracks in the paint film due to subsequent molding are minimized.

The painting method of the water-soluble paint may be appropriately selected from known methods. For example, spray painting such as air spraying, airless spraying, electrostatic spraying, roll painter painting, dip painting, or electrodeposition painting is desirable, and spray painting is more desirable. It is desirable to carry out a drying or baking operation (curing operation) during painting. Baking conditions are preferably about 10 seconds to 30 minutes at 150° C. to 280° C. In the water-soluble paint according to the embodiment, a baking temperature (curing temperature) may be set to 200° C. or more in view of excellent heat resistance and suppression of discoloration (yellowing) and is preferably set to 220° C. or more in view of productivity.

A thickness of the paint film is not particularly limited but is usually about 1 to 50 μm.

A method for molding the metal plate having the paint film is not particularly limited and can be appropriately selected from known methods. For example, in the case of a bottle can having a recappable screw illustrated in FIG. 1, examples for the bottle can include a method for performing die punching of an unpainted metal plate into a cup shape, forming a shell part through drawing or the like, aligning an upper part of a can to a certain height (trimming), cleaning the can, performing printing on an outer surface of the can, baking the can as necessary, spray-painting an inner surface thereof with a paint, baking (heating curing) the paint, and forming a shoulder and a mouth using a mold or the like.

<Painted Plate>

Figure 2:
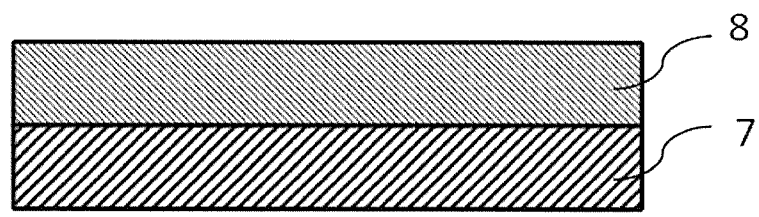
FIG. 2 is a schematic cross-sectional view for describing an embodiment of a painted plate.

A painted plate according to the embodiment includes a substrate and the paint film of the water-soluble paint according to the embodiment. The painted plate will be described based on FIG. 2. Metals or plastics such as described above can be used for a substrate 7. A thickness of the substrate 7 is the same as numerical values described above. Note that an embodiment of the painted plate is not limited to that described based on FIG. 2.

Examples of a shape of the substrate 7 include a flat plate, a three-dimensional shape (not shown), and the like.

Examples of such a three-dimensional shape include a shape in which die cutting is performed on a metal plate into a cup shape, a cylindrical shape, a wavy plate, and the like. Painting of the three-dimensional shape can be performed at an arbitrary timing before and after molding. The painting method of the water-soluble paint, painting conditions, and a thickness of a paint film 8 are the same as those described above. The paint film 8 can be formed on one side of or both surfaces of the substrate 7. The paint film 8 can also be formed through painting of a paint twice or more.

The coated can also be prepared using the painted plate according to the embodiment.

EXAMPLES

Although the water-soluble paint of the specification will be described in detail below using examples, the water-soluble paint is not limited to these examples. Note that, in the examples, "parts" and "%" represent parts by mass and mass %, respectively.

A number average molecular weight can be determined by performing measurement using gel permeation chromatography (GPC).

Synthesis Example 1

Synthesis of Acrylic Copolymer (A-1)

6.5 parts of ethylene glycol monobutyl ester and 15 parts of deionized water were fed into a reaction vessel including a stirrer, a thermometer, a reflux cooling pipe, a dropping tank, and a nitrogen gas inlet pipe, started heating, and refluxed at about 100° C. A mixture of 8.5 parts of methacrylic acid, 5 parts of styrene, 3.5 parts of ethyl acrylate, and 0.24 parts of benzoyl peroxide was continuously added dropwise from the dropping tank over two hours while maintaining the refluxing, and polymerized.

0.03 parts of benzoyl peroxide was added to the mixture after one hour and two hours from the completion of the dropwise addition and a reaction was continued for three hours from the end of the dropwise addition. Subsequently, an acrylic copolymer solution (a nonvolatile content of 44%) having a number average molecular weight of 35,000 and a theoretical glass transition temperature of 79° C. was obtained by cooling.

Subsequently, after two parts of dimethylethanolamine was added and stirring was performed for ten minutes, 59.2 parts of deionized water was added to the solution and the acrylic copolymer was dissolved in water. The result was that an acrylic copolymer (A-1) aqueous solution with a 17% nonvolatile content was obtained.

Synthesis Examples 2 and 3

An acrylic copolymer (A-2) and an acrylic copolymer (A-3) were obtained in the same manner as in Synthesis example 1, except that a type of monomer and an amount of monomer to be blended in were changed as illustrated in Table 1 in Synthesis example 1.

Compositions of the acrylic copolymer (A-1), the acrylic copolymer (A-2), and the acrylic copolymer (A-3) are illustrated in the following Table 1.

TABLE 1

|  | Synthesis example 1 | | Synthesis example 2 | | Synthesis example 3 | |
| --- | --- | --- | --- | --- | --- | --- |
|  | Parts | % | Parts | % | Parts | % |
| Ethylene glycol monobutyl ether | 6.50 | 6.50% | 6.50 | 6.50% | 6.50 | 6.50% |
| Deionized water | 15.00 | 15.00% | 15.00 | 15.00% | 15.00 | 15.00% |
| Methacrylic acid | 8.50 | 8.50% | 8.50 | 8.50% | 8.50 | 8.50% |
| Styrene | 5.00 | 5.00% | 4.80 | 4.80% |  |  |
| Ethyl acrylate | 3.50 | 3.50% | 3.20 | 3.20% | 3.50 | 3.50% |
| Methyl methacrylate |  |  |  |  | 5.00 | 5.00% |
| N-Butoxymethylacrylamide |  |  | 0.50 | 0.50% |  |  |
| Benzoyl peroxide | 0.30 | 0.30% | 0.30 | 0.30% | 0.30 | 0.30% |
| Dimethylethanolamine | 2.00 | 2.00% | 2.00 | 2.00% | 2.00 | 2.00% |
| Deionized water | 59.20 | 59.20% | 59.20 | 59.20% | 59.20 | 59.20% |
| Sum | 100 | 100.00% | 100 | 100.00% | 100 | 100.00% |
| Non-volatile components |  | 17.0% |  | 17.0% |  | 17.0% |

Synthesis Example 4

Synthesis of Trifunctional Phenolic Resin
(Trifunctional Alkaline Resol Type Phenolic Resin)
(D-1)

9.3 parts of carbolic acid as a trifunctional phenol and 36.5 parts of 37% formalin were fed into a four-necked flask purged with nitrogen gas, 3.2 parts of a 25% sodium hydroxide aqueous solution was added to the mixture with stirring, the mixture was reacted at 80° C. for three hours, 30 parts of n-butanol was added to the mixture, the mixture was cooled, 3.7 parts of 20% hydrochloric acid was added to the mixture, and sodium hydroxide in the mixture was neutralized. An aqueous layer was separated from the mixture, a phenolic resin solution layer was taken out from the mixture, the mixture was washed with water, dehydrated, and concentrated, and a trifunctional alkaline resol type phenolic resin (D-1) solution based on purified carbolic acid with a nonvolatile content of 50% was obtained. A number average molecular weight of the obtained phenolic resin was 920.

Synthesis Example 5

Synthesis of Trifunctional Phenolic Resin
(Trifunctional Alkaline Resol Type Phenolic Resin)
(D-2)

10.8 parts of m-cresol and 36.5 parts of 37% formalin were fed into a four-necked flask purged with nitrogen gas as trifunctional phenol, 3.2 parts of a 25% sodium hydroxide aqueous solution was added to the mixture with stirring, the mixture was reacted at 80° C. for two hours, 30 parts of n-butanol was added to the mixture, the mixture was cooled, 3.7 parts of 20% hydrochloric acid was added to the mixture, and sodium hydroxide in the mixture was neutralized. An aqueous layer was separated from the mixture, a phenolic resin solution layer was taken out from the mixture, the mixture was washed with water, dehydrated, and concentrated, and a trifunctional alkaline resol type phenolic resin (D-2) solution based on purified m-cresol with a nonvolatile content of 50% was obtained. A number average molecular weight of the obtained phenolic resin was 1,100.

Synthesis Example 6

Synthesis of Bifunctional Phenolic Resin (Bifunctional Alkaline Resol Type Phenolic Resin) (D-3)

10.8 parts of p-cresol and 36.5 parts of 37% formalin were fed into a four-necked flask purged with nitrogen gas as bifunctional phenol, 3.2 parts of a 25% sodium hydroxide aqueous solution was added to the mixture with stirring, the mixture was reacted at 80° C. for three hours, 30 parts of n-butanol was added to the mixture, the mixture was cooled, 3.7 parts of 20% hydrochloric acid was added to the mixture, and sodium hydroxide in the mixture was neutralized. An aqueous layer was separated from the mixture, a phenolic resin solution layer was taken out from the mixture, the mixture was washed with water, dehydrated, and concentrated, and a bifunctional alkaline resol type phenolic resin (D-3) solution based on purified carbolic acid with a nonvolatile content of 50% was obtained. A number average molecular weight of the obtained phenolic resin was 1,000.

Synthesis Example 7

Synthesis of Bifunctional Phenolic Resin (Bifunctional Alkaline Resol Novolak Type Phenolic Resin) (D-4)

10.8 parts of p-cresol and 24.3 parts of 37% formalin were fed into a four-necked flask purged with nitrogen gas as bifunctional phenol, 0.4 parts of 20% hydrochloric acid was added to the mixture with stirring, the mixture was reacted at 80° C. for three hours, and a novolak type phenolic resin having a number average molecular weight of 440 was obtained. After that, 3.2 parts of a 25% sodium hydroxide aqueous solution was added to the mixture, the mixture was reacted at 80° C. for one hour, and 15 parts of n-butanol was added to the mixture. An aqueous layer was separated from the mixture, a phenolic resin solution layer was taken out from the mixture, the mixture was washed with water, dehydrated, and concentrated, and a bifunctional alkaline resol novolak type phenolic resin (D-4) solution based on purified p-cresol with a nonvolatile content of 50% was obtained. A number average molecular weight of the obtained phenolic resin was 800.

Example 1

30 parts of an acrylic copolymer (A-1) aqueous solution obtained in Synthesis example 1 and 18 parts of deionized water were fed into a reaction vessel including a stirrer, a thermometer, a reflux cooling pipe, dropping tanks, and nitrogen gas inlet pipes, and the mixture was heated to 50° C. with stirring under a nitrogen gas atmosphere.

Separately, 4 parts of styrene, 10 parts of ethyl acrylate, and 0.6 parts of N-butoxymethyl acrylamide were fed into a dropping tank 1. Furthermore, 0.9 parts of 1% aqueous hydrogen peroxide was fed into a dropping tank 2 and 1.2 parts of a 1% sodium erythorbate aqueous solution was fed into a dropping tank 3. A polymer emulsion with a theoretical glass transition temperature of 26° C. was obtained by adding the components dropwise from the dropping tanks over three hours and performing emulsion polymerization on the mixture while maintaining a temperature in a reaction vessel at 50° C. with stirring.

After that, 25.75 parts of deionized water, 5.3 parts of n-butanol, 4 parts of ethylene glycol monobutyl ester, 0.05 parts of dimethylethanolamine, 0.04 parts of a trifunctional alkaline resol type phenolic resin (D-1) solution based on carbolic acid, and 0.36 parts of a bifunctional alkaline resol type phenolic resin (D-3) solution based on p-cresol were added to the mixture and the solution was filtered so that a water-soluble paint (1) with a nonvolatile content of 19.9% was obtained.

Examples 2 to 13

Water-soluble paints (2) to (15) were obtained in the same manner as in Example 1, except that types of components and amounts of components to be blended in were changed as illustrated in Tables 2-1, 2-2, and 2-3 in Example 1.

TABLE 2-1

|  |  |  | Example 1 Water-soluble paint (1) | | Example 2 Water-soluble paint (2) | | Example 3 Water-soluble paint (3) | |
|---|---|---|---|---|---|---|---|---|
|  |  |  | Parts | % | Parts | % | Parts | % |
| Reaction vessel | Acrylic copolymer (A) | Acrylic copolymer (A-1) aqueous solution | 30.000 | 29.94% | 30.000 | 29.94% | 30.000 | 29.94% |
|  |  | Acrylic copolymer (A-2) aqueous solution |  |  |  |  |  |  |
|  |  | Acrylic copolymer (A-3) aqueous solution |  |  |  |  |  |  |
|  |  | Deionized water | 18.000 | 17.96% | 18.000 | 17.96% | 18.000 | 17.96% |
| Dropping tank 1 | Monomer (B1) | Styrene | 4.000 | 3.99% | 4.000 | 3.99% | 4.000 | 3.99% |
|  |  | Ethyl acrylate | 10.000 | 9.98% | 10.000 | 9.98% | 10.000 | 9.98% |
|  |  | Methyl methacrylate |  |  |  |  |  |  |

TABLE 2-1-continued

| | | | | | | | | | | |
|---|---|---|---|---|---|---|---|---|---|---|
| | | Amide-based monomer | N-Butoxy methyl acrylamide | 0.600 | 0.60% | 0.600 | 0.60% | 0.600 | 0.60% |
| | | | N-Methylol acrylamide | | | | | | |
| | | | Acrylamide | | | | | | |
| Dropping tank 2 | Radical initiator | | 1% Hydrogen peroxide solution | 0.900 | 0.90% | 0.900 | 0.90% | 0.900 | 0.90% |
| Dropping tank 3 | Reducing agent | | 1% Sodium erythorbate aqueous solution | 1.200 | 1.20% | 1.200 | 1.20% | 1.200 | 1.20% |
| | | | Deionized water | 25.750 | 25.70% | 25.750 | 25.70% | 25.750 | 25.70% |
| | | | Dimethyl-ethanolamine | 0.050 | 0.05% | 0.050 | 0.05% | 0.050 | 0.05% |
| | | | n-Butanol | 5.300 | 5.29% | 5.300 | 5.29% | 5.300 | 5.29% |
| | | | Ethylene glycol monobutyl ether | 4.000 | 3.99% | 4.000 | 3.99% | 4.000 | 3.99% |
| | Phenolic resin (D) | Trifunctional | Alkaline resol type phenolic resin (D-1) solution | 0.040 | 0.04% | 0.040 | 0.04% | 0.020 | 0.02% |
| | | | Alkaline resol type phenolic resin (D-2) solution | | | | | | |
| | | Bifunctional | Alkaline resol type phenolic resin (D-3) solution | 0.360 | 0.36% | | | | |
| | | | Alkaline resol novolak type phenolic resin (D-4) solution | | 0.00% | 0.360 | 0.36% | 0.380 | 0.38% |
| | | | Sum | 100.200 | 100.00% | 100.200 | 100.00% | 100.20 | 100.00% |
| | | | Nonvolatile components | | 19.9% | | 19.9% | | 19.9% |
| Phenolic resin composition | | | Phenolic resin content | | 1.0% | | 1.0% | | 1.0% |
| | | | Content of trifunctional phenol | | 10% | | 10% | | 5% |
| | | | Content of bifunctional phenol | | 90% | | 90% | | 95% |

| | | | | Example 4 Water-soluble paint (4) | | Example 5 Water-soluble paint (5) | |
|---|---|---|---|---|---|---|---|
| | | | | Parts | % | Parts | % |
| Reaction vessel | Acrylic copolymer (A) | | Acrylic copolymer (A-1) aqueous solution | 30.000 | 29.94% | 30.000 | 29.94% |
| | | | Acrylic copolymer (A-2) aqueous solution | | | | |
| | | | Acrylic copolymer (A-3) aqueous solution | | | | |
| | | | Deionized water | 18.000 | 17.96% | 18.000 | 17.96% |
| Dropping tank 1 | Monomer (B1) | | Styrene | 4.000 | 3.99% | 4.000 | 3.99% |
| | | | Ethyl acrylate | 10.000 | 9.98% | 10.000 | 9.98% |
| | | | Methyl methacrylate | | | | |
| | | Amide-based monomer | N-Butoxy methyl acrylamide | 0.600 | 0.60% | 0.600 | 0.60% |
| | | | N-Methylol acrylamide | | | | |
| | | | Acrylamide | | | | |
| Dropping tank 2 | Radical initiator | | 1% Hydrogen peroxide solution | 0.900 | 0.90% | 0.900 | 0.90% |
| Dropping tank 3 | Reducing agent | | 1% Sodium erythorbate aqueous solution | 1.200 | 1.20% | 1.200 | 1.20% |
| | | | Deionized water | 25.750 | 25.70% | 25.750 | 25.70% |
| | | | Dimethyl-ethanolamine | 0.050 | 0.05% | 0.050 | 0.05% |

TABLE 2-1-continued

|  |  |  |  |  |  |  |  |
|---|---|---|---|---|---|---|---|
|  |  |  | n-Butanol | 5.300 | 5.29% | 5.300 | 5.29% |
|  |  |  | Ethylene glycol monobutyl ether | 4.000 | 3.99% | 4.000 | 3.99% |
|  | Phenolic resin (D) | Trifunctional | Alkaline resol type phenolic resin (D-1) solution | 0.200 | 0.20% | 0.100 | 0.10% |
|  |  |  | Alkaline resol type phenolic resin (D-2) solution |  |  |  |  |
|  |  | Bifunctional | Alkaline resol type phenolic resin (D-3) solution |  |  |  |  |
|  |  |  | Alkaline resol novolak type phenolic resin (D-4) solution | 0.200 | 0.20% | 0.300 | 0.30% |
|  |  |  | Sum | 100.20 | 100.00% | 100.200 | 100% |
|  |  |  | Nonvolatile components |  | 19.9% |  | 19.9% |
| Phenolic resin composition |  |  | Phenolic resin content |  | 1.0% |  | 1.0% |
|  |  |  | Content of trifunctional phenol |  | 50% |  | 25% |
|  |  |  | Content of bifunctional phenol |  | 50% |  | 75% |

TABLE 2-2

|  |  |  |  | Example 6 Water-soluble paint (6) | | Example 7 Water-soluble paint (7) | | Example 8 Water-soluble paint (8) | |
|---|---|---|---|---|---|---|---|---|---|
|  |  |  |  | Parts | % | Parts | % | Parts | % |
| Reaction vessel | Acrylic copolymer (A) |  | Acrylic copolymer (A-1) aqueous solution | 30.000 | 29.94% |  |  |  |  |
|  |  |  | Acrylic copolymer (A-2) aqueous solution |  |  | 30.000 | 29.94% |  |  |
|  |  |  | Acrylic copolymer (A-3) aqueous solution |  |  |  |  | 30.000 | 29.94% |
|  |  |  | Deionized water | 18.000 | 17.96% | 18.000 | 17.96% | 18.000 | 17.96% |
| Dropping tank 1 | Monomer (B1) |  | Styrene | 4.000 | 3.99% | 4.000 | 3.99% |  |  |
|  |  |  | Ethyl acrylate | 10.000 | 9.98% | 10.000 | 9.98% | 10.000 | 9.98% |
|  |  |  | Methyl methacrylate |  |  |  |  | 4.000 | 3.99% |
|  |  | Amide-based monomer | N-Butoxy methyl acrylamide | 0.600 | 0.60% | 0.600 | 0.60% | 0.600 | 0.60% |
|  |  |  | N-Methylol acrylamide |  |  |  |  |  |  |
|  |  |  | Acrylamide |  |  |  |  |  |  |
| Dropping tank 2 | Radical initiator |  | 1% Hydrogen peroxide solution | 0.900 | 0.90% | 0.900 | 0.90% | 0.900 | 0.90% |
| Dropping tank 3 | Reducing agent |  | 1% Sodium erythorbate aqueous solution | 1.200 | 1.20% | 1.200 | 1.20% | 1.200 | 1.20% |
|  |  |  | Deionized water | 25.750 | 25.70% | 25.750 | 25.70% | 25.750 | 25.70% |
|  |  |  | Dimethylethanolamine | 0.050 | 0.05% | 0.050 | 0.05% | 0.050 | 0.05% |
|  |  |  | n-Butanol | 5.300 | 5.29% | 5.300 | 5.29% | 5.300 | 5.29% |
|  |  |  | Ethylene glycol monobutyl ether | 4.000 | 3.99% | 4.000 | 3.99% | 4.000 | 3.99% |
|  | Phenolic resin (D) | Trifunctional | Alkaline resol type phenolic resin (D-1) solution |  |  | 0.040 | 0.04% | 0.040 | 0.04% |

TABLE 2-2-continued

|  |  |  | | | | | | |
|---|---|---|---|---|---|---|---|---|
| | Bifunctional | Alkaline resol type phenolic resin (D-2) solution | 0.100 | 0.10% | | | | |
| | | Alkaline resol type phenolic resin (D-3) solution | | | | | | |
| | | Alkaline resol novolak type phenolic resin (D-4) solution | 0.300 | 0.30% | 0.360 | 0.36% | 0.360 | 0.36% |
| | | Sum | 100.200 | 100.00% | 100.20 | 100.00% | 100.200 | 100.00% |
| | | Nonvolatile components | 19.9% | | 19.9% | | 19.9% | |
| Phenolic resin composition | | Phenolic resin content | 1.0% | | 1.0% | | 1.4% | |
| | | Content of trifunctional phenol | 25% | | 10% | | 10% | |
| | | Content of bifunctional phenol | 75% | | 90% | | 90% | |

| | | | | Example 9 Water-soluble paint (9) | | Example 10 Water-soluble paint (10) | |
|---|---|---|---|---|---|---|---|
| | | | | Parts | % | Parts | % |
| Reaction vessel | Acrylic copolymer (A) | | Acrylic copolymer (A-1) aqueous solution | 30.000 | 29.94% | 24.350 | 24.30% |
| | | | Acrylic copolymer (A-2) aqueous solution | | | | |
| | | | Acrylic copolymer (A-3) aqueous solution | | | | |
| | | | Deionized water | 18.000 | 17.96% | 18.000 | 17.96% |
| Dropping tank 1 | Monomer (B1) | | Styrene | 4.000 | 3.99% | 3.520 | 3.51% |
| | | | Ethyl acrylate | 10.000 | 9.98% | 8.810 | 8.79% |
| | | | Methyl methacrylate | | | | |
| | | Amide-based monomer | N-Butoxy methyl acrylamide | 0.600 | 0.60% | 0.530 | 0.53% |
| | | | N-Methylol acrylamide | | | | |
| | | | Acrylamide | | | | |
| Dropping tank 2 | Radical initiator | | 1% Hydrogen peroxide solution | 0.900 | 0.90% | 0.900 | 0.90% |
| Dropping tank 3 | Reducing agent | | 1% Sodium erythorbate aqueous solution | 1.200 | 1.20% | 1.200 | 1.20% |
| | | | Deionized water | 25.930 | 25.88% | 30.340 | 30.28% |
| | | | Dimethylethanolamine | 0.050 | 0.05% | 0.050 | 0.05% |
| | | | n-Butanol | 5.300 | 5.29% | 5.300 | 5.29% |
| | | | Ethylene glycol monobutyl ether | 4.000 | 3.99% | 4.00 | 3.99% |
| | Phenolic resin (D) | Trifunctional | Alkaline resol type phenolic resin (D-1) solution | 0.004 | 0.00% | 0.300 | 0.30% |
| | | | Alkaline resol type phenolic resin (D-2) solution | | | | |
| | | Bifunctional | Alkaline resol type phenolic resin (D-3) solution | | | 2.700 | 2.69% |

TABLE 2-2-continued

| | | | | | | | |
|---|---|---|---|---|---|---|---|
| | | Alkaline resol novolak type phenolic resin (D-4) solution | 0.036 | 0.04% | 3.000 | 2.99% |
| | | Sum | 100.20 | 99.82% | 103.000 | 102.79% |
| | | Nonvolatile components | | 19.7% | | 19.4% |
| | Phenolic resin composition | Phenolic resin content | | 0.1% | | 15.0% |
| | | Content of trifunctional phenol | | 10% | | 5% |
| | | Content of bifunctional phenol | | 90% | | 95% |

TABLE 2-3

| | | | Example 11 Water-soluble paint (11) | | Example 12 Water-soluble paint (12) | | Example 13 Water-soluble paint (13) | |
|---|---|---|---|---|---|---|---|---|
| | | | Parts | % | Parts | % | Parts | % |
| Reaction vessel | Acrylic copolymer (A) | Acrylic copolymer (A-1) aqueous solution | 30.000 | 29.99% | 29.690 | 28.83% | 28.920 | 28.63% |
| | | Acrylic copolymer (A-2) aqueous solution | | | | | | |
| | | Acrylic copolymer (A-3) aqueous solution | | | | | | |
| | | Deionized water | 18.000 | 18.00% | 18.000 | 17.48% | 18.000 | 17.82% |
| Dropping tank 1 | Monomer (B1) | Styrene | 4.000 | 4.00% | 3.960 | 3.84% | 3.860 | 3.82% |
| | | Ethyl acrylate | 10.000 | 10.00% | 9.900 | 9.61% | 9.640 | 9.54% |
| | | Methyl methacrylate | | | | | | |
| | Amide-based monomer | N-Butoxy methyl acrylamide | 0.600 | 0.60% | 0.590 | 0.57% | 0.580 | 0.57% |
| | | N-Methylol acrylamide | | | | | | |
| | | Acrylamide | | | | | | |
| Dropping tank 2 | Radical initiator | 1% Hydrogen peroxide solution | 0.900 | 0.90% | 0.900 | 0.87% | 0.900 | 0.89% |
| Dropping tank 3 | Reducing agent | 1% Sodium erythorbate aqueous solution | 1.200 | 1.20% | 1.200 | 1.17% | 1.200 | 1.19% |
| | | Deionized water | 26.210 | 26.20% | 25.910 | 25.16% | 26.550 | 26.29% |
| | | Dimethylethanolamine | 0.050 | 0.05% | 0.050 | 0.05% | 0.050 | 0.05% |
| | | n-Butanol | 5.300 | 5.30% | 5.300 | 5.15% | 5.300 | 5.25% |
| | | Ethylene glycol monobutyl ether | 4.000 | 4.00% | 4.000 | 3.88% | 4.000 | 3.96% |
| | Phenolic resin (D) Trifonctional | Alkaline resol type phenolic resin (D-1) solution | 0.020 | 0.02% | 0.100 | 0.10% | 0.200 | 0.20% |
| | | Alkaline resol type phenolic resin (D-2) solution | | | | | | |
| | Bifunctional | Alkaline resol type phenolic resin (D-3) solution | | | | | | |
| | | Alkaline resol novolak type phenolic resin (D-4) solution | 0.180 | 0.18% | 0.900 | 0.87% | 1.800 | 1.78% |
| | | Sum | 100.460 | 100.44% | 100.500 | 97.57% | 101.000 | 100.00% |
| | | Nonvolatile components | | 19.7% | | 19.9% | | 19.8% |

TABLE 2-3-continued

| Phenolic resin composition | Phenolic resin content | | 0.5% | | 2.5% | | 5.0% | |
|---|---|---|---|---|---|---|---|---|
| | Content of trifunctional phenol | | 10% | | 10% | | 10% | |
| | Content of bifunctional phenol | | 90% | | 90% | | 90% | |

| | | | Example 14 Water-soluble paint (14) | | Example 15 Water-soluble paint (15) | |
|---|---|---|---|---|---|---|
| | | | Parts | % | Parts | % |
| Reaction vessel | Acrylic copolymer (A) | Acrylic copolymer (A-1) aqueous solution | 27.400 | 26.86% | 30.000 | 29.94% |
| | | Acrylic copolymer (A-2) aqueous solution | | | | |
| | | Acrylic copolymer (A-3) aqueous solution | | | | |
| | | Deionized water | 18.000 | 17.65% | 18.000 | 17.96% |
| Dropping tank 1 | Monomer (B1) | Styrene | 3.650 | 3.58% | 4.000 | 3.99% |
| | | Ethyl acrylate | 9.130 | 8.95% | 10.000 | 9.98% |
| | | Methyl methacrylate | | | | |
| | Amide-based monomer | N-Butoxy methyl acrylamide | 0.550 | 0.54% | 0.200 | 0.20% |
| | | N-Methylol acrylamide | | | 0.200 | 0.20% |
| | | Acrylamide | | | 0.200 | 0.20% |
| Dropping tank 2 | Radical initiator | 1% Hydrogen peroxide solution | 0.900 | 0.88% | 0.900 | 0.90% |
| Dropping tank 3 | Reducing agent | 1% Sodium erythorbate aqueous solution | 1.200 | 1.18% | 1.200 | 1.20% |
| | | Deionized water | 27.820 | 27.27% | 25.750 | 25.70% |
| | | Dimethyl-ethanolamine | 0.050 | 0.05% | 0.050 | 0.05% |
| | | n-Butanol | 5.300 | 5.20% | 5.300 | 5.29% |
| | | Ethylene glycol monobutyl ether | 4.000 | 3.92% | 4.000 | 3.99% |
| | Phenolic resin (D) | Trifunctional | Alkaline resol type phenolic resin (D-1) solution | 0.200 | 0.20% | 0.040 | 0.04% |
| | | | Alkaline resol type phenolic resin (D-2) solution | | | | |
| | | Bifunctional | Alkaline resol type phenolic resin (D-3) solution | | | | |
| | | | Alkaline resol novolak type phenolic resin (D-4) solution | 3.800 | 3.73% | 0.360 | 0.36% |
| | | Sum | 102.000 | 100.00% | 100.200 | 100.00% |
| | | Nonvolatile components | | 19.6% | | 19.9% |
| Phenolic resin composition | | Phenolic resin content | | 10.0% | | 1.0% |
| | | Content of trifunctional phenol | | 5% | | 10% |
| | | Content of bifunctional phenol | | 95% | | 90% |

Compositions of the water-soluble paints (1) to (5), compositions of water-soluble paints (6) to (10), and compositions of water-soluble paints (11) to (15) are illustrated in Tables 2-1, 2-2, and 2-3.

Example 16

18 parts of deionized water were fed into a reaction vessel including a stirrer, a thermometer, a reflux cooling pipe, dropping tanks, and nitrogen gas inlet pipes, and the deionized water was heated to 50° C. with stirring under a nitrogen gas atmosphere.

Separately, a mixture of 4 parts of styrene, 10 parts of ethyl acrylate, and 0.6 parts of N-butoxymethyl acrylamide was subjected to emulsification using 30 parts of an acrylic copolymer (A-1) aqueous solution obtained in Synthesis example 1 and fed into a dropping tank 1. Furthermore, 0.9 parts of 1% aqueous hydrogen peroxide was fed into a dropping tank 2 and 1.2 parts of a 1% sodium erythorbate aqueous solution was fed into a dropping tank 3. A polymer emulsion with a theoretical glass transition temperature of 26° C. was obtained by dropping the components from the dropping tanks over three hours and performing emulsion polymerization on the mixture while maintaining a temperature in a reaction vessel at 50° C. with stirring.

After that, 25.75 parts of deionized water, 5.3 parts of n-butanol, 4 parts of ethylene glycol monobutyl ester, 0.05 parts of dimethylethanolamine, 0.04 parts of a trifunctional alkaline resol type phenolic resin (D-1) solution based on carbolic acid, and 0.36 parts of a bifunctional alkaline resol type phenolic resin (D-3) solution based on p-cresol were added to the mixture and filtered so that a water-soluble paint (16) with a nonvolatile content of 19.9% was obtained.

Example 17

A water-soluble paint (17) was obtained in the same manner as in Example 16, except that types of components and amounts of components to be blended in were changed as illustrated in Table 3 in Example 16.

Components of the water-soluble paints (16) and (17) are illustrated in the following Table 3.

TABLE 3

| | | | | Example 16 Water-soluble paint (16) | | Example 17 Water-soluble paint (17) | |
|---|---|---|---|---|---|---|---|
| | | | | Parts | % | Parts | % |
| Reaction vessel | | | Deionized water | 18.000 | 17.96% | 18.000 | 17.96% |
| Dropping tank 1 | Monomer (B1) | | Styrene | 4.000 | 3.99% | | |
| | | | Ethyl acrylate | 10.000 | 9.98% | 10.000 | 9.98% |
| | | | Methyl methacrylate | | | 4.000 | 3.99% |
| | | Amide-based monomer | N-Butoxy methyl acrylamide | 0.600 | 0.60% | 0.600 | 0.60% |
| | Acrylic copolymer (A) | | Acrylic copolymer (A-1) | 30.000 | 29.94 | | |
| | | | Acrylic copolymer (A-3) | | | 30.000 | 29.94% |
| Dropping tank 2 | Radical initiator | | 1% Hydrogen peroxide solution | 0.900 | 0.90% | 0.900 | 0.90% |
| Dropping tank 3 | Reducing agent | | 1% Sodium erythorbate aqueous solution | 1.200 | 1.20% | 1.200 | 1.20% |
| | | | Deionized water | 25.750 | 25.70% | 25.750 | 25.70% |
| | | | Dimethylethanolamine | 0.050 | 0.05% | 0.050 | 0.05% |
| | | | n-Butanol | 5.300 | 5.295 | 5.300 | 5.29% |
| | | | Ethylene glycol monobutyl ether | 4.000 | 3.99% | 4.000 | 3.99% |
| | Phenolic resin (D) | Trifunctional | Alkaline resol type phenolic resin (D-1) solution | 0.040 | 0.04% | 0.040 | 0.04% |
| | | | Alkaline resol type phenolic resin (D-2) solution | | | | |
| | | Bifunctional | Alkaline resol type phenolic resin (D-3) solution | | | | |
| | | | Alkaline resol novolak type phenolic resin (D-4) solution | 0.360 | 0.36% | 0.360 | 0.36% |
| | | | Sum | 100.200 | 100.00% | 100.200 | 100.00% |
| | | | Nonvolatile components | 19.9% | | 19.9% | |
| Phenolic resin composition | | | Phenolic resin content | 1.0% | | 1.0% | |
| | | | Content of trifunctional phenol | 10% | | 10% | |
| | | | Content of bifunctional phenol | 90% | | 90% | |

Comparative Examples 1 and 2

Water-soluble paints (18) and (19) were obtained in the same manner as in Example 1, except that types of components and amounts of components to be blended in were changed as illustrated in Table 4 in Example 1.

Components of the water-soluble paints (18) and (19) are illustrated in the following Table 4.

TABLE 4

|  |  |  | Comparative example 1 Water-soluble paint (18) | | Comparative example 2 Water-soluble paint (19) | |
| --- | --- | --- | --- | --- | --- | --- |
|  |  |  | Parts | % | Parts | % |
| Reaction vessel | Acrylic copolymer (A) | Acrylic copolymer (A-1) aqueous solution | 30.000 | 29.94% | 24.350 | 23.42% |
|  |  | Acrylic copolymer (A-2) aqueous solution |  |  |  |  |
|  |  | Acrylic copolymer (A-3) aqueous solution |  |  |  |  |
|  |  | Deionized water | 18.000 | 17.96% | 18.000 | 17.31% |
| Dropping tank 1 | Monomer (B1) | Styrene | 4.000 | 3.99% | 3.520 | 3.39% |
|  |  | Ethyl acrylate | 10.000 | 9.98% | 8.810 | 8.47% |
|  |  | Methyl methacrylate |  |  |  |  |
|  | Amide-based monomer | N-Butoxy methyl acrylamide | 0.600 | 0.60% | 0.530 | 0.51% |
|  |  | N-Methylol acrylamide |  |  |  |  |
|  |  | Acrylamide |  |  |  |  |
| Dropping tank 2 | Radical initiator | 1% Hydrogen peroxide solution | 0.900 | 0.90% | 0.900 | 0.87% |
| Dropping tank 3 | Reducing agent | 1% Sodium erythorbate aqueous solution | 1.200 | 1.20% | 1.200 | 1.15% |
|  |  | Deionized water | 25.750 | 25.70% | 27.820 | 26.76% |
|  |  | Dimethylethanolamine | 0.050 | 0.05% | 0.050 | 0.055 |
|  |  | n-Butanol | 5.300 | 5.29% | 5.300 | 5.10% |
|  |  | Ethylene glycol monobutyl ether | 4.000 | 3.99% | 4.000 | 3.85% |
|  | Phenolic resin (D) Trifunctional | Alkaline resol type phenolic resin (D-1) solution | 0.400 | 0.40% |  |  |
|  |  | Alkaline resol type phenolic resin (D-2) solution |  |  |  |  |
|  | Bifunctional | Alkaline resol type phenolic resin (D-3) solution |  |  |  |  |
|  |  | Alkaline resol novolak type phenolic resin (D-4) solution |  |  | 9.500 | 9.14% |
|  |  | Sum | 100.20 | 100.00% | 103.980 | 100.00% |
|  |  | Nonvolatile components |  | 19.9% |  | 20.9% |
| 21.8% Phenolic resin composition |  | Phenolic resin content |  | 1.0% |  | 21.8% |
|  |  | Content of trifunctional phenol |  | 100% |  | 0% |
|  |  | Content of bifunctional phenol |  | 0% |  | 100% |

[Evaluation of Paint Film]

Test panels were obtained by painting aluminum plates with a thickness of 0.26 mm with the obtained water-soluble paints so that a thickness of the paint films was 5 µm and performing the following two levels of baking on the aluminum plates using a gas oven were obtained.

Standard conditions: baking at an ambient temperature of 200° C. for two minutes High temperature conditions: baking at an ambient temperature of 250° C. for two minutes The following evaluation was performed on the obtained test panels.

<Paint Coloring>

Coloring states (yellowed states) of paint films of the test panels obtained by performing baking in standard conditions and in high temperature conditions were visually evaluated.

A: No coloring at all, colorless and transparent (good)

B: Although slight coloringcoloring was observed, there were no practical problems (usable)

C: Significant coloring (yellowing) was observed and there is a problem in practical use (poor)

<Processability>

Figure 3A:
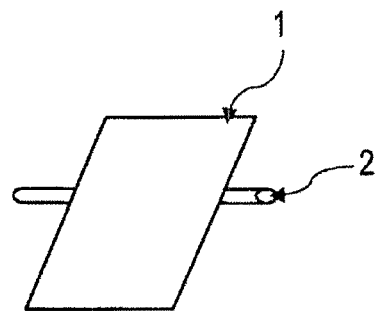
FIG. 3(a) to (c) are schematic diagrams for describing a method for preparing a test piece of a processability test.
Figure 3B:
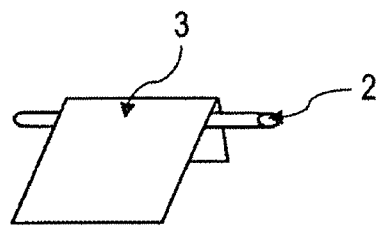
Figure 3C:
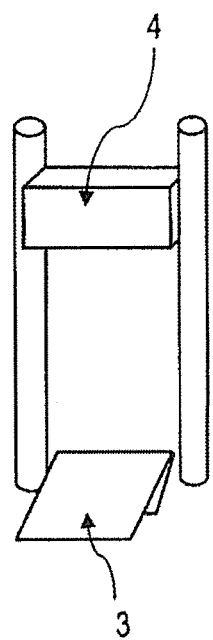

Test panels baked in the standard conditions were prepared with a size of a width of 30 mm and a length of 50 mm. Subsequently, as shown in FIG. 3(a), with the paint film of the test panel 1 facing outward, a round bar 2 with a diameter of 3 mm was applied to a position 30 mm along the length. Moreover, as shown in FIG. 3(b), the test panel 1 was folded in half along the round bar 2 so that test pieces 3 with a size of a width of 30 mm and a length of about 30 mm were prepared. Two aluminum plates (not shown) with a thickness of 0.26 mm were interposed between the pieces of test piece 3 bent in half, which was fully bent by dropping a 1 kg weight 4 having a rectangular parallelepiped shape with a width of 15 cm×a height of 5 cm×a depth of 5 cm from a height of 40 cm to the bent portions of the test piece 3 as shown in FIG. 3(c).

Subsequently, folded portions of test pieces 4 were immersed in a 1% saline solution. Subsequently, current values when a current at 6.0 V×4 seconds was passed between metal portions of flat portions of the test pieces 4 which were not immersed in the saline solution were measured.

When processability of a paint film is poor, the bent portion of a paint film cracks, and since the conductivity is high due to the exposed metal plate in a layer underneath, a current value is high.

A+: less than 5 mA (very good)
A: 5 mA or more and less than 10 mA (good)
B: 10 mA or more and less than 20 mA (usable)
C: 20 mA or more (poor)

<Gel Fraction>

Test panels baked in the standard condition were prepared to have a size with a width of 15 cm and a length of 15 cm. Subsequently, the test panels were immersed in methylethylketone (MEK) refluxed at 80° C. for 60 minutes, and a gel fraction was calculated from change in weight of the test panels before and after the immersion.

A: 95% or more (good)
B: 90% or more and less than 95% (usable)
C: Less than 90% (poor)

<Retort Resistance>

Retort treatment was carried out in a retort oven at 125° C. for 30 minutes while test panels baked in the standard condition were immersed in water and surface states of paint films after the retort treatment were visually evaluated.

A: No change with respect to paint film before retort treatment (good)
B: Some whitening was observed, but there was no practical problem (usable)
C: Significant whitening and blistering were observed and there was a problem in practical use (poor)

<Corrosion Resistance>

Test panels baked in the standard conditions were immersed in an aqueous solution in which 3% of sodium chloride and 3% of malic acid of 3% were dissolved, and surface states of paint films after two weeks at 37° C. were visually evaluated.

A: No corrosion, no change with respect to paint film before immersion (good)
B: Although slight change was observed from paint film before immersion, there was no corrosion and there was no practical problem (usable)
C: Significant corrosion was observed in the paint film and there were problems in practical use (poor)

<Sanitary>

Test panels baked in the standard condition were prepared to have a size of a width of 15 cm and a length of 15 cm. Retort treatment was performed on the test panels in a retort oven at 120° C. for 30 minutes while the test panels were immersed in 225 mL of deionized water. Water after the retort treatment was analyzed using "TOC-L CPH" (manufactured by Shimadzu Corporation) and a total organic carbon (TOC) content was measured. Note that a TOC content indicates a total amount of organic substances present in water is represented by an amount of carbon in the organic substances.

A+: less than 1 ppm (very good)
A: 1 ppm or more and less than 2 ppm (good)
B: 2 ppm or more and less than 5 ppm (usable)
C: 5 ppm or more (poor)

Evaluation results of the water-soluble paints (1) to (18) are illustrated in the following Table 5.

As illustrated in Table 5, coloring during heating to a high temperature was observed in a water-soluble paint of Comparative example 1 in which the trifunctional phenolic resin (D3) was independently used as the phenolic resin (D) and a water-soluble paint of Comparative example 2 in which the bifunctional phenolic resin (D2) is independently used as the phenolic resin (D) and a large amount of the bifunctional phenolic resin (D2) was blended in to compensate for insufficient curability.

In water-soluble paints of Examples 1 to 16 in which the bifunctional phenolic resin (D2) and the trifunctional phenolic resin (D3) were combined as the phenolic resin (D) so that the mass ratio ((D2)/(D3)) was within the range of 95/5 to 40/60, coloring could be minimized even during heating to a high temperature and excellent processability, retort resistance, corrosion resistance, and sanitary could also be provided.

TABLE 5

| | Examples | | | | | | | | | | | | | | | | | Comparative examples | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 1 | 2 |
| Painting coloring (normal) | A | A | A | A | A | A | A | A | A | A | A | A | A | A | A | A | A | A | A |
| Painting coloring | A | A | A | B | A | A | A | A | A | A | A | A | B | B | A | A | A | C | C |
| Processability | A | A+ | A+ | A | A | A | A+ | A+ | A+ | A+ | A+ | B | B | B | A | A+ | A+ | A | C |
| Gel fraction | A | A | B | A | A | B | A | A | B | A | A | A | A | A | A | A | A | A | A |
| Retort resistance | A | A | A | A | A | A | A | A | B | A | A | A | A | A | A | A | A | A | A |
| Corrosion resistance | A | A | B | A | B | B | A | B | B | A | A | A | A | A | A | B | A | A | A |
| Sanitary | A+ | A+ | A | A+ | A | A | A | A+ | B | A | A | A | B | B | A | A+ | A+ | A+ | C |

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A water-soluble paint, comprising:
a polymer emulsion (C) including a shell part containing an acrylic polymer (A) having a carboxyl group and a core part containing an acrylic polymer (B) having an amide group, wherein a proportion of a monomer having the carboxyl group with respect to monomers constituting the acrylic polymer (A) is 20 mass % or more and 80 mass % or less with respect to 100 mass % of a total amount of monomers constituting the acrylic polymer (A), and a proportion of a monomer having the amide group with respect to monomers constituting the acrylic polymer (B) is 0.1 mass % or more and 20 mass % or less with respect to 100 mass % of a total amount of monomers constituting the acrylic polymer (B); and
a phenolic resin (D) consisting of a bifunctional phenolic resin (D2) based on one or more bifunctional phenols and a trifunctional phenolic resin (D3) based on one or more trifunctional phenols, wherein a mass ratio ((D2)/(D3)) between a total amount of the bifunctional phenolic resin (D2) in the water-soluble paint and a total amount of the trifunctional phenolic resin (D3) in the water-soluble paint is 95/5 to 40/60, and wherein 0.1 parts by mass or more and 25 parts by mass or less of the phenolic resin (D) with respect to 100 parts by mass of a solid content of the polymer emulsion (C) is contained.

2. The water-soluble paint according to claim 1, wherein the proportion of the monomer having the amide group with respect to monomers constituting the acrylic polymer (B) is 0.5 mass % or more and 20 mass % or less with respect to 100 mass % of a total amount of monomers constituting the acrylic polymer (B).

3. The water-soluble paint according to claim 1, which is used for coating of a can member for accommodating beverages or foods.

4. A painted plate comprising:
a substrate; and
a paint film of the water-soluble paint according to claim 1.

5. A coated can, comprising:
a paint film of the water-soluble paint according to claim 1 provided on at least a part of a can member surface.

* * * * *